(No Model.) 3 Sheets—Sheet 1.

D. C. SUMMERS.
COTTON CHOPPER AND CULTIVATOR.

No. 573,369. Patented Dec. 15, 1896.

Witnesses
Percy C. Bowen
J. Stephen Giusta

Inventor
D. C. Summers,
by Whitman & Wilkinson,
Attorneys (No Model.) 3 Sheets—Sheet 2.
D. C. SUMMERS.
COTTON CHOPPER AND CULTIVATOR.
No. 573,369. Patented Dec. 15, 1896.
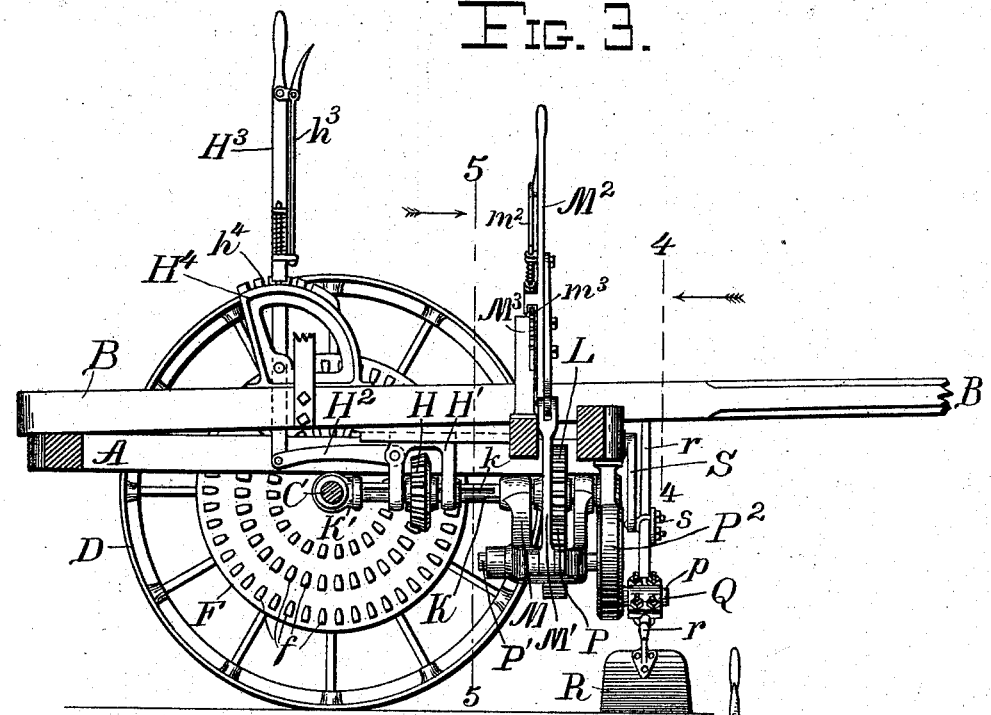
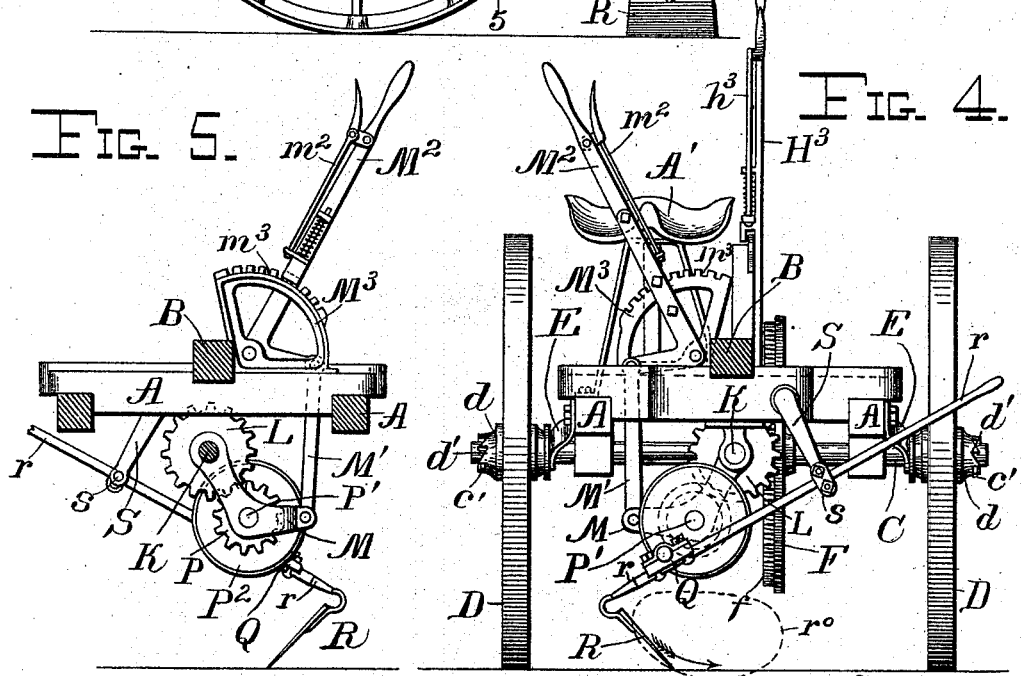
Witnesses
Percy C. Bowen
J. Stephen Giusta
Inventor
D. C. Summers,
by Whitman & Wilkinson
Attorneys

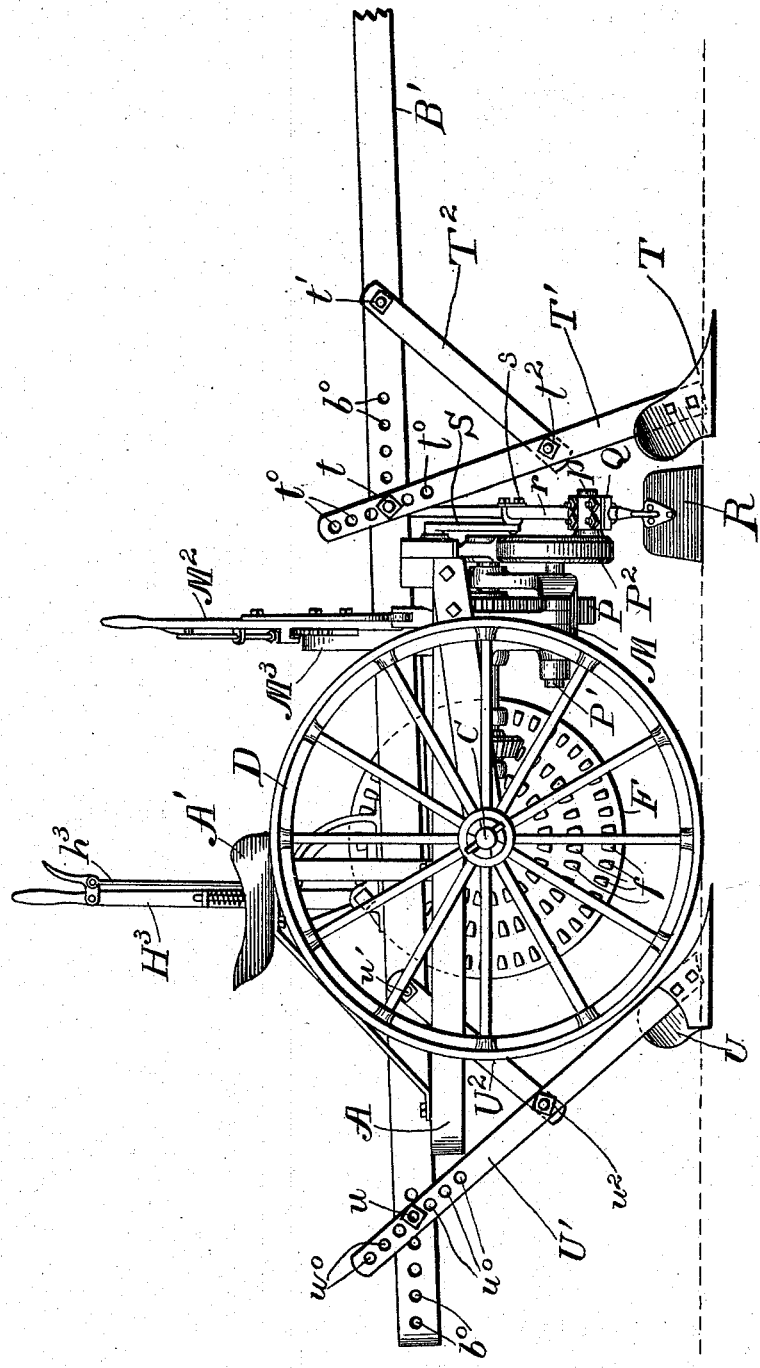

UNITED STATES PATENT OFFICE.

DEWITT C. SUMMERS, OF WACO, TEXAS, ASSIGNOR OF ONE-HALF TO BART MOORE, OF SAME PLACE.

COTTON CHOPPER AND CULTIVATOR.

SPECIFICATION forming part of Letters Patent No. 573,369, dated December 15, 1896.

Application filed March 16, 1896. Serial No. 583,445. (No model.)

*To all whom it may concern:*

Be it known that I, DEWITT C. SUMMERS, a citizen of the United States, residing at Waco, in the county of McLennan and State of Texas, have invented certain new and useful Improvements in Cotton Choppers and Cultivators; and I do hereby declare the following to be a full, clear, and exact description of the invention, such as will enable others skilled in the art to which it appertains to make and use the same.

My invention relates to improvements in cotton-choppers and a combined cotton chopper and cultivator; and it consists of certain novel features hereinafter described and claimed.

Reference is had to the accompanying drawings, in which the same parts are indicated by the same letters throughout the several views.

Figure 1:
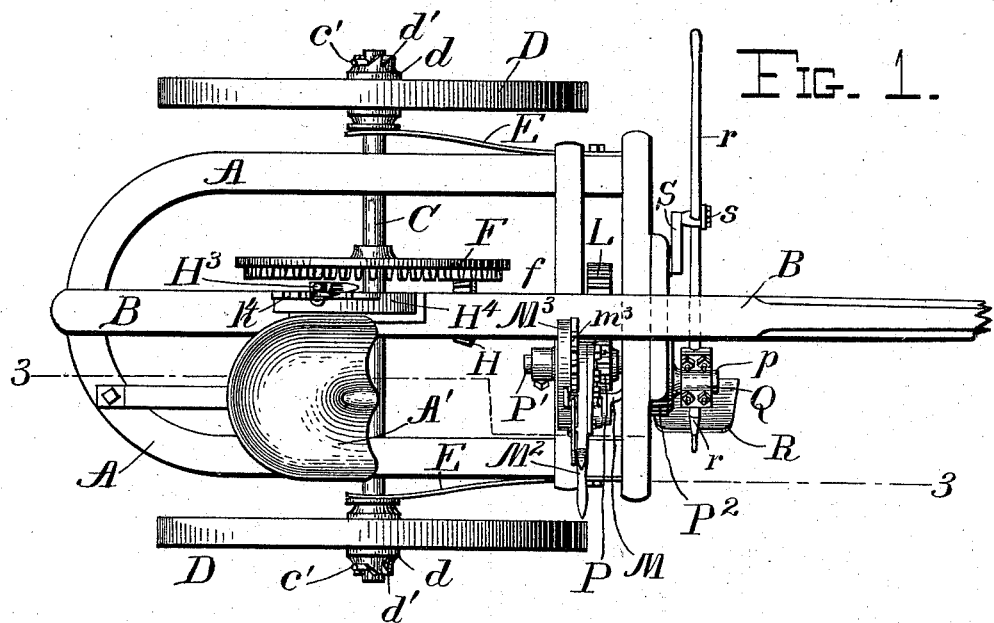
Figure 2:
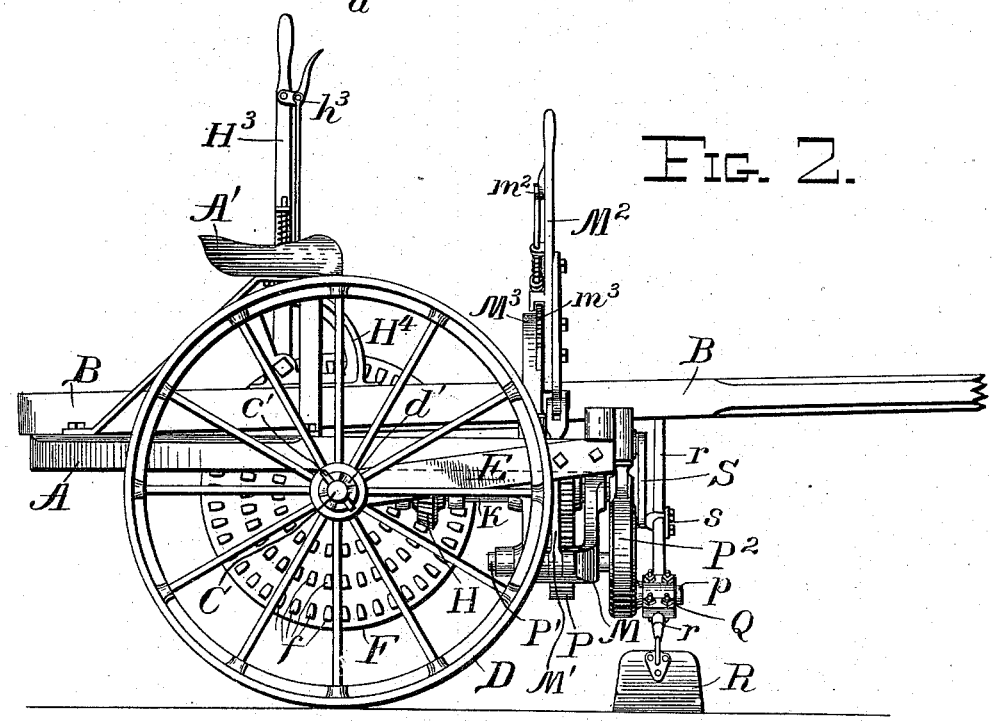

Figure 1 is a plan view of a cotton-chopper constructed according to my invention. Fig. 2 is a side elevation of the cotton-chopper shown in Fig. 1. Fig. 3 represents a section along the broken line 3 3 of Fig. 1 and looking toward the top of the sheet. Fig. 4 represents a sectional elevation along line 4 4 of Fig. 3, looking to the left. Fig. 5 represents a section of the device along the line 5 5 of Fig. 3, looking to the right. Fig. 6 is a side elevation of the combined chopper and cultivator constructed according to my invention.

A represents the framework of the machine, secured to the pole B, by which the machine is drawn in any convenient way.

C represents the axle of the machine, on which the wheels D are mounted. These wheels are revolubly mounted on this axle C, but are adapted to turn with the axle as the machine goes forward and to rotate independent of the axle when the machine is moved backward, whereby the chopping apparatus is thrown out of operation when the machine is moved backward. This is accomplished by having the hub $d$ provided with a plurality of teeth $d'$, having a holding-face on one side and an inclined face on the other, which holding-face engages the pin $c'$, placed transversely through the axis as the machine is drawn forward, while the said pin $c'$ slips over the other face of these teeth as the machine is forced backward. The hub $d'$ of the wheel is kept forced against this pin $c'$ by means of the spring E, made fast to the frame A. Thus it will be seen that as the machine goes forward it is coupled onto the shaft C, while as it moves backward it rotates independently of the said shaft.

F represents a differential gear-wheel provided with a plurality of teeth $f$, arranged in concentric circles, as shown clearly in Figs. 2, 3, and 6. The number of these concentric circles may be varied at will. H represents a pinion adapted to mesh in any one of these circles of teeth $f$, which pinion is provided with a feather meshing in the slot $k$ in the shaft K. This pinion is held in the frame H', which is moved longitudinally relative to the said shaft K, by means of the link $H^2$ and the hand-lever $H^3$, having the spring-pawl attachment $h^3$, which engages in the teeth $h^4$ on the curved rack $H^4$, made fast to the pole B or to the framework of the machine in any convenient way. This shaft K carries the gear-wheel L, which meshes in the gear-wheel P on the shaft P', which shaft also carries the crank-disk or fly-wheel $P^2$, having a crank-pin $p$, projecting from the face thereof, to which the sleeve Q is revolubly attached, which sleeve is adapted to hold the handle $r$ of the chopper R. This handle is connected also to the sleeve $s$ and pivotally connected to the swinging arm S, journaled at its upper end in the framework A. This shaft P' is journaled in the swinging arm M, suspended near one end upon the shaft K and connected near the other end to the link M', which is lifted by the bell-crank lever $M^2$, having the spring-pawl attachments $m^2$ engaging in the teeth $m^3$ on the curved rack $M^3$, which rack is attached to the framework A in any convenient way.

It will be seen that if the lever $H^3$ is moved to the right or left the frame H', and consequently the pinion H, will be moved toward or away from the center of the gear-wheel F, while if the lever $M^2$ be moved across the machine to the right or left the frame M and the shaft P', with the chopping attachment, will be raised or lowered, as the case may be.

In Fig. 6 in addition to the chopping attachments pure and simple I have shown two plows, which may be of any desired type of plow, shovel or otherwise, attached to the stocks T', which stocks are made vertically adjustable by means of the bolt $t$, which bolt passes through the holes $b^0$. These plows are stayed or braced by means of the braces T, connected to the stocks T', pivotally connected to the pole D' by the bolts $t'$. I have shown two of these plows adapted to plow the earth away.

Two shovel-plows may be used, or cultivator-teeth or any device of a like character may be used. Behind the chopping apparatus I have also shown in Fig. 6 two pulverizing-plows adapted to break up and throw the earth back toward the cotton-plant, which plows may also be of any suitable or desired type. These plows U are connected to the stock U' and longitudinally adjustable by means of the holes $u^0$ and $b^0$ and the bolt $u$, while the trace $U^2$, pivotally connected, as at $u^3$, to the plow-stock U' and at $u^2$ to the pole B', serves to support the said plows in position.

The operation of the cotton-chopping apparatus is as follows: As the machine is drawn forward the wheels D rotate the shaft C and the gear-wheel F, which imparts rotary motion to the pinion H and the shaft K. The shaft K turns the pinion L, and the gear-wheel P rotates the fly-wheel $P^2$ and crank-pin $p$. The rotation of this crank-pin $p$ causes the chopper R to swing around in the path indicated by the dotted lines $r^0$ in Fig. 4, and the motion of this hoe R is precisely similar to that of a hoe operated by hand in the ordinary way. In certain parts of the field or under certain different conditions it becomes necessary to make the hoe R chop more frequently or less frequently, as the case may be, and this is accomplished by moving the hand-lever $H^3$ backward or forward, which causes the pinion H to engage in the outer or inner rows of teeth $f$, whereby a more or less rapid rotation is given to the pinion H, and consequently the speed of the hoe is increased or diminished, as desired. Again, it frequently becomes necessary to lift the chopping apparatus clear of the ground, to avoid stones or other obstructions, or to lower it to cut into hollows, and this is accomplished by moving the hand-lever $M^2$ to the right or left, thus raising the shaft P' and causing the hoe R to pass clear of such obstructions or to project down into said hollows. By this arrangement an ideal range of adjustment is possible both in the speed of the chopping apparatus and in the ability to chop or not, as may be required.

It will be evident that this form of apparatus may be combined with any suitable kind of plow, scraper, harrow, cultivator, or the like whereby the ground is worked while the chopping is done, to the consequent saving of time and labor.

The advantages of the herein-described apparatus will readily suggest themselves to any practical mind.

It will be obvious that the chopping attachment may be removed from the combined cotton chopper and cultivator, thus using the frame and wheels for the ordinary purposes of a wheeled cultivator. It will also be evident that the chopping-blades may be secured directly to the disk $P^2$, and in such case a plurality of such blades may be used, if desired. It will also be obvious that various other modifications of the herein-described apparatus might be made which could be used without departing from the spirit of my invention.

Having thus described my invention, what I claim, and desire to secure by Letters Patent of the United States, is—

1. In a cotton-chopper, the combination with an axle and driving-wheels, and a frame mounted thereon, of a gear-wheel fast on said axle and provided with differential teeth arranged in a series of concentric circles, a counter-shaft with a pinion adapted to slide longitudinally but held against turning thereon, means for moving this pinion to cause it to engage said differential teeth, a swinging frame, a crank or disk journaled therein, a crank-pin fast on said crank or disk, a chopping-hoe having its handle revolubly connected to said crank-pin, a pivoted support for the upper portion of said hoe-handle, and mechanism driven by said counter-shaft for operating said crank-pin and said chopping knife or blade, substantially as described.

2. In a cotton-chopper, the combination with an axle and driving-wheels, and a frame mounted thereon, of a gear-wheel fast on said axle and provided with differential teeth, a counter-shaft longitudinally disposed in said frame, a pinion mounted on said counter-shaft and adapted to slide longitudinally but held against turning thereon, means for moving this pinion to cause it to engage said differential teeth, a swinging frame suspended from said counter-shaft, a gear-wheel fast on said counter-shaft, a second gear-wheel journaled in said swinging frame and meshing in the first gear-wheel, a crank-arm and a crank-pin rotated by the said second gear-wheel, a chopping-hoe having its handle revolubly connected to said crank-pin, a swinging support for the upper portion of said hoe-handle, and means for raising and lowering said swinging frame and the parts carried thereby, substantially as described.

3. In a cotton-chopper, the combination with an axle and driving-wheels, and a frame mounted thereon, of a gear-wheel fast on said axle and provided with differential teeth, a counter-shaft longitudinally disposed in said frame, a pinion mounted on said counter-shaft and adapted to slide longitudinally but held against turning thereon, a hand-lever for moving this pinion to cause it to engage said differential teeth, a chopping knife or blade, mechanism driven by said counter-shaft for operating said knife or blade, and means for raising and lowering said mechanism and the cutting-blade operated thereby, substantially as described.

4. In a cotton-chopper, the combination with an axle and driving-wheels, and a frame mounted thereon, of a gear-wheel fast on said axle and provided with differential teeth, a counter-shaft revolubly connected to said axle with a pinion adapted to slide longitudinally but held against turning thereon, a hand-lever for moving this pinion to cause it to engage said differential teeth, a chopping knife or blade, and mechanism suspended and driven by said counter-shaft for operating said chopping knife or blade, substantially as described.

5. In a cotton-chopper, the combination with an axle and driving-wheels, and a frame mounted thereon, of a gear-wheel fast on said axle and provided with differential teeth, a counter-shaft longitudinally disposed in said frame and revolubly connected to said axle, a pinion mounted on said counter-shaft and adapted to slide longitudinally but held against turning thereon, a hand-lever for moving this pinion to cause it to engage said differential teeth, a swinging frame suspended from said counter-shaft, a hand-lever adapted to raise and lower said swinging frame, a cutting-blade supported from said swinging frame, and mechanism driven by said counter-shaft for operating said cutting-blade, substantially as described.

6. In a cotton-chopper, the combination with an axle and driving-wheels, connected to said shaft by a ratchet-and-pawl gearing, and frame mounted on said axle, of a gear-wheel fast on said axle and provided with differential teeth arranged in a series of concentric circles, a counter-shaft with a pinion adapted to slide longitudinally but held against turning thereon, means for moving this pinion to cause it to engage said differential teeth, a chopping knife or blade, and mechanism driven by said counter-shaft for operating said chopping knife or blade, substantially as described.

7. In a cotton-chopper, the combination with an axle and driving-wheels connected to said axle by a ratchet-and-pawl gearing, and a frame mounted on said axle, of a gear-wheel fast on said axle and provided with differential teeth, a counter-shaft longitudinally disposed in said frame, a pinion mounted on said counter-shaft and adapted to slide longitudinally but held against turning thereon, means for moving this pinion to cause it to engage said differential teeth, a chopping knife or blade, mechanism driven by said counter-shaft for operating said knife or blade, and means for raising and lowering said mechanism and the cutting-blade operated thereby, substantially as described.

8. In a cotton-chopper, the combination with an axle and driving-wheels connected to said axle by a ratchet-and-pawl gearing, and a frame mounted on said axle, of a gear-wheel fast on said axle and provided with differential teeth arranged in a series of concentric circles, a counter-shaft with a pinion adapted to slide longitudinally but held against turning thereon, means for moving this pinion to cause it to engage said differential teeth, a swinging frame, a combined crank-disk and fly-wheel journaled therein, a crank-pin fast on said crank or disk, a chopping-hoe having its handle revolubly connected to said crank-pin, a pivoted support for the upper portion of said hoe-handle, and mechanism driven by said counter-shaft for operating said crank-pin and said chopping knife or blade, substantially as described.

9. In a cotton-chopper, the combination with an axle and driving-wheels connected to said axle by a ratchet-and-pawl gearing and a frame mounted on said axle, of a gear-wheel fast on said axle and provided with differential teeth, a counter-shaft longitudinally disposed in said frame, a pinion mounted on said counter-shaft and adapted to slide longitudinally but held against turning thereon, means for moving this pinion to cause it to engage said differential teeth, a swinging frame suspended from said counter-shaft, a gear-wheel fast on said counter-shaft, a second gear-wheel journaled in said swinging frame and meshing in the first gear-wheel, a combined crank-disk and fly-wheel rotated by the said second gear-wheel, a crank-pin fast on said disk, a chopping-hoe having its handle revolubly connected to said crank-pin, a swinging support for the upper portion of said hoe-handle, and means for raising and lowering said swinging frame and the parts carried thereby, substantially as described.

10. In a cotton-chopper, the combination with an axle and driving-wheels connected to said axle by a ratchet-and-pawl gearing, and a frame mounted on said axle, of a gear-wheel fast on said axle and provided with differential teeth arranged in a series of concentric circles, a counter-shaft with a pinion adapted to slide longitudinally but held against turning thereon, a hand-lever adapted to move this pinion in either direction to cause it to engage said differential teeth, a chopping knife or blade, and mechanism driven by said counter-shaft for operating said chopping knife or blade, substantially as described.

11. In a cotton-chopper, the combination with an axle and driving-wheels connected to said axle by a ratchet-and-pawl gearing, and a frame mounted on said axle, of a gear-wheel fast on said axle and provided with differential teeth arranged in a series of concentric circles, a counter-shaft longitudinally disposed in said frame, a pinion mounted on said counter-shaft and adapted to slide longitudinally but held against turning thereon, a hand-lever for moving this pinion to cause it to engage said differential teeth, a chopping knife or blade, mechanism driven by said counter-shaft for operating said knife or blade, and a hand-lever and mechanism operated thereby for raising and lowering said 12. In a cotton-chopper, the combination with an axle and driving-wheels, and a frame mounted thereon, of a gear-wheel fast on said axle and provided with differential teeth arranged in a series of concentric circles, a counter-shaft revolubly connected to said axle with a pinion adapted to slide longitudinally but held against turning thereon, a hand-lever for moving this pinion to cause it to engage said differential teeth, a chopping knife or blade, mechanism suspended on and driven by said counter-shaft for operating said chopping knife or blade and means for lifting said blade and mechanism, substantially as described.

13. In a cotton-chopper, the combination with an axle and driving-wheels connected to said axle by a ratchet-and-pawl gearing, and a frame mounted thereon, of a gear-wheel fast on said axle and provided with differential teeth arranged in a series of concentric circles, a counter-shaft longitudinally disposed in said frame and revolubly connected to said axle, a pinion mounted on said counter-shaft and adapted to slide longitudinally but held against turning thereon, means for moving this pinion to cause it to engage said differential teeth, a swinging frame suspended from said counter-shaft, a hand-lever adapted to raise and lower said swinging frame, a cutting-blade supported from said swinging frame, and mechanism driven by said counter-shaft for operating said blade, substantially as described.

In testimony whereof I affix my signature in presence of two witnesses.

DEWITT C. SUMMERS.

Witnesses:
BART MOORE,
S. H. LACKLAND.